United States Patent
Byron et al.

(10) Patent No.: US 11,501,087 B2
(45) Date of Patent: *Nov. 15, 2022

(54) POPULATING AN EXPERT-SYSTEM KNOWLEDGEBASE BASED ON CORRESPONDENCES BETWEEN KNOWLEDGEBASE AXIOMS AND BUSINESS PROCESSES

(71) Applicant: International Business Machines Corporation, Armonk, NY (US)

(72) Inventors: Donna K. Byron, Petersham, MA (US); Reinaldo T. Katahira, Anhagabau (BR); Lakshminarayanan Krishnamurthy, Round Rock, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 651 days.

This patent is subject to a terminal disclaimer.

(21) Appl. No.: 16/556,820

(22) Filed: Aug. 30, 2019

(65) Prior Publication Data

US 2019/0384823 A1 Dec. 19, 2019

Related U.S. Application Data

(63) Continuation of application No. 15/050,586, filed on Feb. 23, 2016, now Pat. No. 10,460,042, which is a
(Continued)

(51) Int. Cl.
*G06F 40/55* (2020.01)
*G06N 5/02* (2006.01)
*G06N 5/04* (2006.01)

(52) U.S. Cl.
CPC ............. *G06F 40/55* (2020.01); *G06N 5/02* (2013.01); *G06N 5/046* (2013.01)

(58) Field of Classification Search
None
See application file for complete search history.

(56) References Cited

U.S. PATENT DOCUMENTS

| 6,507,856 B1 | 1/2003 | Chen |
| 7,512,576 B1 | 3/2009 | Syeda-Mahmood |
| (Continued) | | |

OTHER PUBLICATIONS

Amendment filed Mar. 21, 2019 in response to Office Action (dated Feb. 12, 2019) for U.S. Appl. No. 15/050,586, filed Feb. 23, 2016; Confirmation No. 1864.

(Continued)

*Primary Examiner* — Alan Chen
(74) *Attorney, Agent, or Firm* — Schmeiser, Olsen & Watts, LLP; David Mattheis

(57) ABSTRACT

A knowledgebase of an expert system is populated with rules inferred from a set of business processes that govern the manner in which the business interacts with users. Each business process contains an input, an output, an action, and a set of dependency relationships that relate pairs of the input, the output, and the action. Each process's input, output, action, and dependency relationships are translated, respectively, into a subject, an object, a predicate, and a set of dependency relationships among the subject, object, and predicate, of a natural-language rule. Each rule is stored in the expert system's knowledgebase as a directed graph, and nodes representing each stored subject, object, and predicate are assigned domain classifications as a function of characteristics of the business rule. These domain classifications are represented within the knowledgebase as a set of domain classifications determined as a further function of characteristics of the business rule.

20 Claims, 2 Drawing Sheets

Related U.S. Application Data continuation of application No. 13/928,495, filed on Jun. 27, 2013, now Pat. No. 9,324,025.

(56) References Cited

U.S. PATENT DOCUMENTS

| | | | |
|---|---|---|---|
| 8,112,257 | B2 | 2/2012 | Weber |
| 8,301,573 | B2 | 10/2012 | Chen |
| 8,326,795 | B2 | 12/2012 | Markovic |
| 8,332,864 | B2 | 12/2012 | Bose |
| 9,317,814 | B2 | 4/2016 | Byron |
| 9,324,025 | B2 | 4/2016 | Byron |
| 10,460,042 | B2 * | 10/2019 | Byron ............ G06F 40/55 |
| 2008/0097748 | A1 | 4/2008 | Haley |
| 2009/0077531 | A1 | 3/2009 | Miloslavsky |
| 2010/0031232 | A1 | 2/2010 | Glazier |
| 2010/0031240 | A1 | 2/2010 | Drumm |
| 2010/0070517 | A1 | 3/2010 | Ghosh |
| 2010/0082691 | A1 | 4/2010 | Jaster |
| 2011/0029947 | A1 | 2/2011 | Markovic |
| 2012/0284386 | A1 | 11/2012 | Liu |
| 2013/0006698 | A1 | 1/2013 | Roy |
| 2014/0156733 | A1 | 6/2014 | Goranson |
| 2014/0289173 | A1 | 9/2014 | Byron |
| 2015/0006437 | A1 | 1/2015 | Byron |
| 2016/0170976 | A1 | 6/2016 | Byron |

OTHER PUBLICATIONS

Amendment filed Mar. 31, 2015 in response to Office Action (dated Mar. 12, 2015) for U.S. Appl. No. 13/848,083, filed Mar. 21, 2013; Confirmation No. 7307.
Amendment filed Jun. 4, 2019 in response to Office Action (dated May 1, 2019) for U.S. Appl. No. 14/986,795, filed Jan. 4, 2016; Confirmation No. 1953.
Amendment filed Sep. 17, 2015 in response to Final Office Action (dated Jul. 17, 2015) for U.S. Appl. No. 13/848,083, filed Mar. 21, 2013; Confirmation No. 7307.
Amendment filed Nov. 5, 2015 in response to Office Action (dated Aug. 13, 2015) for U.S. Appl. No. 13/928,495, filed Jun. 27, 2013; Confirmation No. 1017.
Anya et al., A Conceptual Design of an Adaptive and Collaborative e-Work Environment, Proceedings of the First Asia International Conference on Modelling & Simulation (AMS '07), 0-7695-2845-7/07, 2007 IEEE, 7 pages.
Battle, Steve, et al "Semantic Web Services Ontology (SWSO)," W3C Member Submission Sep. 9, 2005, 53 pages.
Brambilla et al., Process Modeling in Web Applications, 2001 ACM 1073-0516/01/0300-0034, 39 pages.
Cimiano Philipp "Learning Concept Hierarchies from Text Corpora using Formal Concept Analysis," Journal of Artificial Intelligence Research 24 (2005) p. 305-339.
Dang et al ("An ontological knowledge framework for adaptive medical workflow", Journal of Biomedical Information 41 (2008), pp. 829-836). (Year: 2008).

Filipowska et al., Organisational Ontology Framework for Semantic Business Process management, 13 pages.
Final Office Action (dated Jul. 17, 2015) for U.S. Appl. No. 13/848,083, filed Mar. 21, 2013; Confirmation No. 7307.
Hepp et al., An Ontology Framework for Semantic Business Process Management, Proceedings of Wirtschaftsinformatik 2007, Feb. 28-Mar. 2, 2007, Karlsruhe (forthcoming), 18 pages.
Hepp et al., Semantic Business Process Management: A Vision Towards Using Semantic Web Services for Business Process Management, 6 pages.
Jenz & Partner, Research, Analysis and Consulting with a clear Focus on Business Process Integration, Ontology-Based Business Process Editor in Development, Retrieved from the Internet: <URL: http://www.bpiresearch.com/Resources/RE_BPEdit/re_bpedit.htm>, 1 page.
Leida et al (A Lightweight RDF Data Model for Business Process Analysis: Data-Driven Process Discovery and Analysis Series: Lecture Notes in Business Information Processing 116, 2012, pp. 1-24) (Year: 2012).
Maedche, Alexander, et al, "The Ontology Extraction & Maintenance Framework Text-To-Onto" Proceedings of the ICDM'01, Workshop on Integrating Data Mining and Knowledge Management, 2001.
Notice of Allowance (dated Jan. 22, 2016) for U.S. Appl. No. 13/848,083, filed Mar. 21, 2013; Confirmation No. 7307.
Notice of Allowance (dated Jan. 26, 2016) for U.S. Appl. No. 13/928,495, filed Jun. 27, 2013; Confirmation No. 1017.
Notice of Allowance (dated Jun. 19, 2019) for U.S. Appl. No. 15/050,586, filed Feb. 23, 2016; Confirmation No. 1864.
Notice of Allowance (dated Oct. 14, 2015) for U.S. Appl. No. 13/848,083, filed Mar. 21, 2013; Confirmation No. 7307.
Notice of Allowance (dated Nov. 25, 2015) for U.S. Appl. No. 13/928,495, filed Jun. 27, 2013; Confirmation No. 1017.
Office Action (dated Feb. 12, 2019) for U.S. Appl. No. 15/050,586, filed Feb. 23, 2016; Confirmation No. 1864.
Office Action (dated Mar. 12, 2015) for U.S. Appl. No. 13/848,083, filed Mar. 21, 2013; Confirmation No. 7307.
Office Action (dated May 1, 2019) for U.S. Appl. No. 14/986,795, filed Jan. 4, 2016; Confirmation No. 1953.
Office Action (dated Aug. 13, 2015) for U.S. Appl. No. 13/928,495, filed Jun. 27, 2013; Confirmation No. 1017.
Request for Continued Examination (dated Jul. 17, 2015) for U.S. Appl. No. 13/848,083, filed Mar. 21, 2013; Confirmation No. 7307.
Request for Continued Examination (dated Dec. 10, 2015) for U.S. Appl. No. 13/928,495, filed Jun. 27, 2013; Confirmation No. 1017.
Sahota et al., Ttl: Decomposing a process model in an enterprise intelligence 6974, Database: Dimple (Dossier); 2011.
Sirin et al., Semi-automatic Composition of Web Services using Semantic Descriptions, 9 pages.
Smith et al ("Rule-Based Behavioral Reasoning on Semantic Business Processes", Proc. Of the 5th International Conference on Agents and Artificial Intelligence, 2013, pp. 1-13) (Year: 2013).

* cited by examiner

POPULATING AN EXPERT-SYSTEM KNOWLEDGEBASE BASED ON CORRESPONDENCES BETWEEN KNOWLEDGEBASE AXIOMS AND BUSINESS PROCESSES

CROSS REFERENCE TO RELATED APPLICATIONS

This application is a continuation application claiming priority to Ser. No. 15/0505,586 filed Feb. 23, 2016, now U.S. Pat. No. 10,460,042 issued Oct. 29, 2019, which is a continuation application claiming priority to Ser. No. 13/928,495 filed Jun. 27, 2013 now U.S. Pat. No. 9,324,025 issued Apr. 26, 2016, the contents of which are hereby incorporated by reference.

TECHNICAL FIELD

The present invention relates to automatically translating a description of a business process into rules for an expert system's natural-language interactions with users.

BACKGROUND

An artificially intelligent expert-system computer program may infer rules of behavior from data and logic stored in a knowledgebase that represents characteristics of real-world entities and activities. An expert system may use information and logic stored in a knowledge base to infer appropriate ways to interact with users, using human-like natural-language communications. But it is difficult to ensure that a knowledgebase accurately captures subtle nuances of, and relationships among, real-world entities and activities because methods of representing aspects of the real world may not be designed to be translated seamlessly into a format in which a knowledgebase may be designed.

BRIEF SUMMARY

A first embodiment of the present invention provides a method for automating natural-language interactions between an expert system and a user, wherein the expert system comprises a set of rules for interacting with the user, the method comprising:

a processor of a computer system automatically translating a first business process of a set of business processes of a business into a first rule of the set of rules, wherein the natural-language communication relates to the first business process; and wherein the first rule is selected from the group comprising:

a rule for assigning meaning to a natural-language communication communicated from a user to the expert system, a rule for formulating a natural-language reply to the natural-language communication, a rule for formulating a natural-language question to the user in response to receiving the natural-language communication;

a rule for inferring additional rules from the natural-language communication, and a rule for performing an other action or subtask in response to the natural-language communication.

A second embodiment of the present invention provides a computer program product, comprising a computer-readable hardware storage device having a computer-readable program code stored therein, said program code configured to be executed by a processor of a computer system to implement a method for automating natural-language interactions between an expert system and a user, wherein the expert system comprises a set of rules for interacting with the user, the method comprising:

the processor automatically translating a first business process of a set of business processes of a business into a first rule of the set of rules, wherein the natural-language communication relates to the first business process; and wherein the first rule is selected from the group comprising:

a rule for assigning meaning to a natural-language communication communicated from a user to the expert system, a rule for formulating a natural-language reply to the natural-language communication, a rule for formulating a natural-language question to the user in response to receiving the natural-language communication;

a rule for inferring additional rules from the natural-language communication, and a rule for performing an other action or subtask in response to the natural-language communication.

A third embodiment of the present invention provides a computer system comprising a processor, a memory coupled to said processor, and a computer-readable hardware storage device coupled to said processor, said storage device containing program code configured to be run by said processor via the memory to implement a method for automating natural-language interactions between an expert system and a user, wherein the expert system comprises a set of rules for interacting with the user, the method comprising:

the processor automatically translating a first business process of a set of business processes of a business into a first rule of the set of rules, wherein the natural-language communication relates to the first business process; and wherein the first rule is selected from the group comprising:

a rule for assigning meaning to a natural-language communication communicated from a user to the expert system, a rule for formulating a natural-language reply to the natural-language communication, a rule for formulating a natural-language question to the user in response to receiving the natural-language communication;

a rule for inferring additional rules from the natural-language communication, and a rule for performing an other action or subtask in response to the natural-language communication.

DETAILED DESCRIPTION

Figure 1:
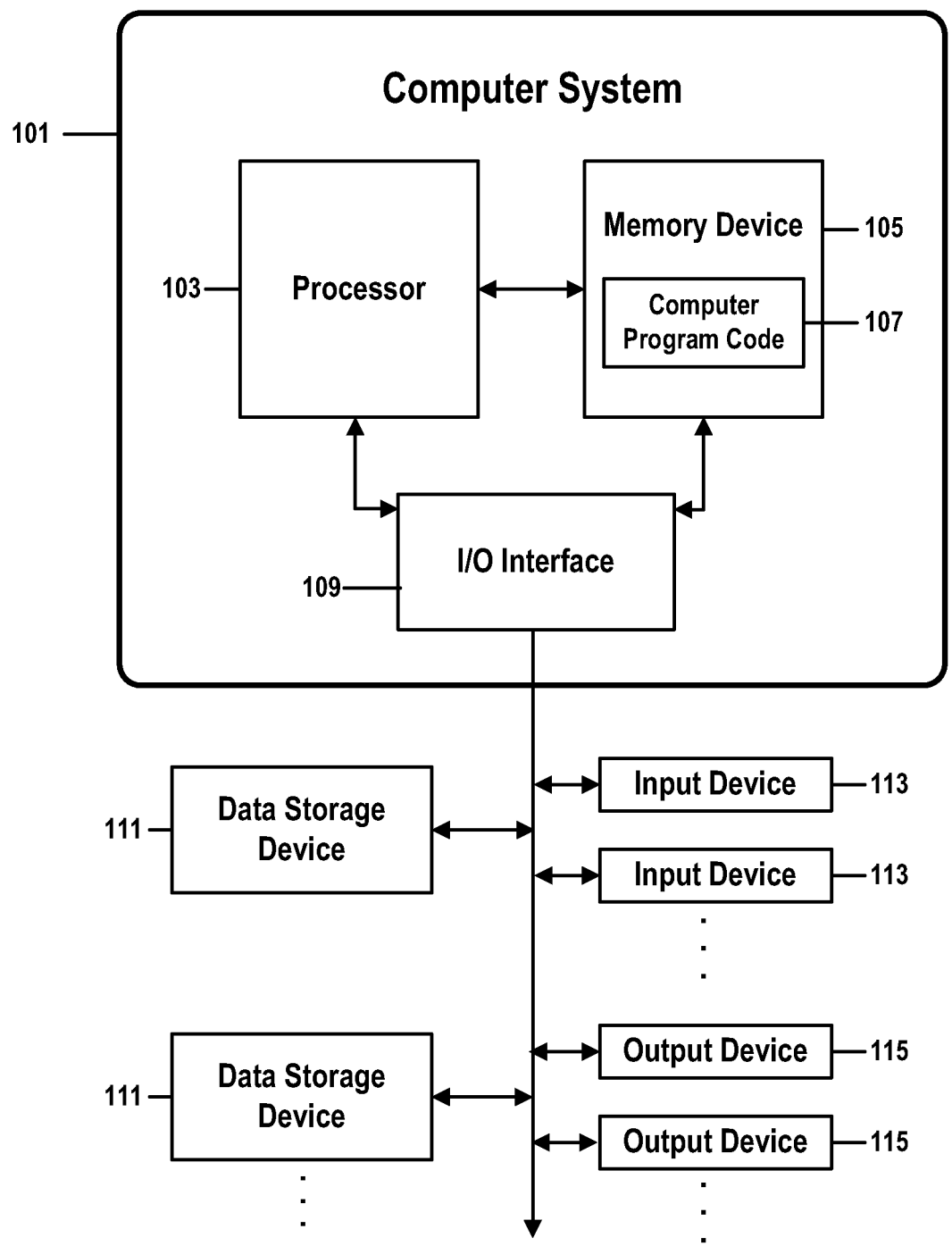
FIG. 1 shows the structure of a computer system and computer program code that may be used to implement a method for automating natural-language interactions between an expert system and a user in accordance with embodiments of the present invention.

The present invention automatically translates a description of a business process into information from which an expert system may infer a set of rules about how to use natural-language communications to interact with users about the business process.

An expert system is an artificially intelligent computer program that emulates cognitive behavior of human beings. Expert systems may interact with users through natural-language communications, which are freeform verbal interactions that mimic human conversations. The artificial intelligence that underlies an expert system may be represented all or in part by data and logic stored in a data structure known as a knowledgebase.

The contents of a knowledgebase may represent a set of rules (sometimes called "axioms") that help an expert system determine appropriate format and content of its natural-language interactions. A knowledgebase may also comprise representations of real-world entities and processes from which such rules may be inferred.

In some embodiments, a knowledgebase may represent rules all or in part as a set of context-sensitive data elements and a set of context-sensitive relationships between pairs of those elements. A knowledgebase may organize these elements and relationships in many ways, including, but not limited to, combinations of hierarchies, trees, tables, linked lists, semantic chains, networks, databases, and directed or nondirected graphs. In an embodiment wherein a knowledgebase is internally organized as a directed-graph data structure, the context-sensitive elements and relationships may be represented respectively as nodes and dependencies of the directed graph.

A knowledgebase may represent characteristics of rules by organizing stored nodes into dependencies that imply functions or relationships among the real-world entities and processes represented by those nodes. One method of storing such information is to represent a rule as a "triple" data structure (that is, a data item that comprises three ordered elements). A knowledgebase may store a set of such triples in structure known as a "triple store."

The exact content and internal organization of a knowledgebase and of a knowledgebase component like a triple store are implementation-dependent and may be a function of a purpose of the expert system, of a context (or "domain") of the subject matter of the expert system, of a platform upon which the expert system is implemented, or of a combination of these or other design-dependent, business-dependent, and implementation-dependent factors.

Creating an expert system that may converse with users about one or more business activities may require designing and populating all or part of a knowledgebase components with representations of the one or more business processes. Because management-science experts, who analyze and model business processes, generally do not work in the field of artificial intelligence, the task of designing and implementing an expert system that understands the inner workings of a business may involve ad hoc, informal, or inconsistent methods of translating an initial representation of the one or more business processes into a representative form that may be stored in a knowledgebase. In some development efforts, at least some transitional or interim translations can only be performed manually or without benefit of a common interface standard.

Designing such an expert system may thus be a cumbersome, nonstandardized procedure that is vulnerable to errors and omissions. Furthermore, using such ad hoc methods to populate a knowledgebase with information about a set of related business activities may make it hard to accurately identify and represent subtle relationships among elements of those activities.

Embodiments of the present invention comprise a method of automatically translating a standardized representation of a business process into a form that may be stored in a knowledgebase. Such stored information may represent all or part of the expert system's understanding of the business process and may comprise, or facilitate an inference of, rules that help the expert system accurately determine how to communicate with users during interactions related to the business process. The use of standardized, analogous modeling formats makes possible an automated translation procedure that may automatically generate expert-system rules (or corresponding knowledgebase data) as a function of a representation of a business process.

Within the scope of this document, a business process may describe one or more business activities. A business activity may comprise, but is not limited to, an activity that a business directs toward producing or supporting a service or product for one or more customers, or an activity related to an internal operation or function of a business, such as human-resource management, financial analysis, manufacturing, quality control, legal compliance, accounting, or executive management. A business process may further comprise one or more core business characteristics, operations, or functions, such as a business's organizational structure or its methods of creating revenue.

A business process may be broken down into a set of one or more related activities that a business directs toward producing a service or product for a particular customer or customers. Such processes may comprise, but are not limited to: an operational process that implements a primary operation of an enterprise, such as manufacturing, logistics, or sales; a management process, such as an executive-management policy or a line-supervision procedure; a support process, which may further comprise peripheral functions related to specific departmental units like Human Resources or Customer Support; or an other core process of the business.

A business process may be represented in many ways, including, but not limited to, representation in a business-process model, where the business-process model is an information structure that may formally or informally represent characteristics of one or more business processes. Business-process models may take many forms and may be structured, formatted, or organized in many ways, sometimes comprising both structured and unstructured stores of data.

A business-process model might, for example, comprise formal or informal representations of a business's policies, procedures, service offerings or product lines, organizational structures, security framework, or workflows. Such a model may also comprise information from which a domain or context of these representations may be inferred, as well as representations of dependencies and other relationships among elements of the represented business activities.

The business-process model may thus comprise any type of logic or data that might help an expert system infer a rule that determines, supports, guides, or otherwise relates to natural-language user interactions about an activity represented by the model. Such inferring may further comprise inferring an addition, revision, deletion, or replacement of a rule of the expert system, and may be performed with or without consideration of extrinsic information that may include, but is not limited to, a natural-language interaction with a user, external sources of documentation, other informational sources, or a logical conclusion drawn as a function of combinations of any of these resources.

Embodiments of the present invention may associate a business-process model representation of a business process, or of a component activity of a business process, as comprising three types of elements: i) one or more input entities; ii) one or more output entities; and iii) a function or action. Associating such a three-element representation with one or more structurally similar three-element representations stored in an expert-system's knowledgebase may facilitate an automated translation of the business process or activity representation into a form from which an expert-system may infer a rule for user interaction related to the process or activity.

A business-process model that represents a business process or a component activity of a business process, may thus comprise three types of elements of the business process. These three types of elements may respectively identify one or more instances of: i) an acting or input entity; ii) an action or function performed by the acting entity or performed upon the input entity; and iii) an output entity that identifies a result of performing the action upon the input entity or that identifies an entity upon which an acting entity performs the action.

In some embodiments, a representation may comprise only one instance of each of the three types of elements. In some embodiments, elements may be organized by type of element an ordered 3-tuple, or "triple" and each member of the three members of the triple may in turn comprise more than one element. In such embodiments, the three members of each triple may be stored in any order. But the members and the elements that comprise each member should be stored according to a consistent, predictable pattern in order to facilitate a reliable translation of the contents of the business-process model into a format that is compatible with that of a knowledgebase.

In an example wherein a computer-diagnostic business process comprises one instance of each type of element, an activity of the process might be represented in a business-process model as a triplet (technician, diagnose, diagnosis). In other embodiments, wherein context, a design goal, a business priority, or an other factor might suggest an other representation, the process might be represented as (technician, diagnose, computer) or (Error Code A03, interpret error code, hard-drive failure). In yet another example, a production of a quarterly manufacturing report might be represented as a triplet (daily production figures, data aggregation, quarterly report).

Depending on how a business conceptualizes and organizes its operations and components, a business-process model may represent more than one business process, a business process may comprise more than one business activity, and a business activity may comprise more than one business process.

Business processes and the elements that comprise them may be organized or related by dependencies or by other types of relationships, and those dependencies and other types of relationships may be represented within a business-process model or across more than one business-process model by organizing represented processes, activities, and elements into data structures. These data structures may comprise, but not limited to, combinations of hierarchies, trees, tables, linked lists, semantic chains, networks, databases, and directed or nondirected graphs.

A behavioral rule of an expert system, or information stored in the expert system's knowledgebase from which the rule may be inferred, may be similarly conceptualized, represented, and organized into data structures. These data structures may organize information in a knowledgebase as a function of a dependency or other relationship between analogous business processes, activities, or elements represented in one or more business-process models.

A triple store of a knowledgebase may comprise one or more triples organized into a data structure, wherein the triples comprise elements that correspond to, or are otherwise a function of, one or more of the business process's acting or input entities, functions or actions, or output entities. Furthermore, members of the triples stored in the knowledgebase may be organized within a data structure in ways that may be functions of inter-element relationships comprised by a business-process model. A knowledgebase that comprises a triple store data repository, where the repository is formatted and structured according to embodiments of the present invention, may thus represent a business process that is represented in one or more business-process models formatted and structured according to embodiments of the present invention.

In an example of how a knowledgebase may be formatted and structured according to embodiments of the present invention, consider a knowledgebase, defined within a context (the knowledgebase's "domain") of a company's computer network, that represents concepts:

user
computer
memory
installed memory
memory usage.

These concepts might be related by a set of three-element (input, function, output) rules, which may be encoded into the knowledgebase as triple data items and sets of relationships or dependencies among elements of the triple data items. Such rules might be logically stated as:

user may use computer
memory may be installed
computer may contain installed memory
user may monitor usage of installed memory.

In practice, the encoding into the knowledgebase may store these logical statements in a form and organize them into a data structure known to those skilled in the art of expert-system design. The form and data structure should, nonetheless, preserve or facilitate an element-by-element correspondence with a format used to represent analogous logic in the business-process model.

In such embodiments, a rule, logical premise, or statement of functionality stored or encoded into a knowledgebase may be represented by a type of triple data structure that comprises a predicate, a subject, and an object, wherein the predicate identifies an action or function; the subject performs the predicate action or function or is an input to the predicate action or function; and the object is a result of performing the predicate action or function or is an entity upon which the predicate action or function is performed.

Such a conceptualization and format are analogous to a three-element representation, as described above, of a business process or activity in a business-process model that conforms to embodiments of the present invention. The statement "user may monitor usage of installed memory," for example, might be analogous to a business-process model representation "(user, monitor usage, installed memory)".

Here, a logical premise extracted from a business process or activity is represented and stored in a knowledgebase in a way that lets an expert system infer one or more rules of interaction, where these one or more rules may help an expert system identify a logical premise, draw a conclusion, interpret or compose natural language statements, or make an other decision related to interactions about the business process or activity.

In some embodiments, the rule, logical premise, or statement of functionality stored in a knowledgebase may be represented or expressed in other syntactical forms. An axiom that expresses a logical relationship "a user monitors memory usage," for example, may be expressed as "monitors (user, memory usage)," where the triple's predicate would be "monitors," its subject "user," and its object "memory usage." The same logical relationship might also be expressed in alternate functional notation as the expression "memoryusage hasmonitor user." Other variations are possible, so long as the format of information stored in the knowledgebase is relatable, through an automated translation or other function, to a format used to represent analogous information stored in a business-process model.

It is known in the art that the behavior of an artificially intelligent expert system when interacting with a user may be all or partly determined as a function of inferences drawn from data and logic stored in a knowledgebase. By automatically translating information and logic stored in a set of business-process models into a structured knowledgebase, embodiments of the present invention thus provide an automated method by which an expert system's natural-language user interaction related to a business process may be all or partly determined as a function of inferences drawn from an appropriate model of the business process.

Embodiments of the present invention may similarly preserve and translate relationships among business processes and relationships among elements of business processes. This preservation and translation may be accomplished by organizing triple data structures stored in a triple store of a knowledgebase into data structures that are analogous to the ways in which elements of business processes are organized in one or more corresponding business-process models. Such knowledgebase and business-process model organizations and data structures may comprise, but are not limited to, combinations of hierarchies, trees, tables, linked lists, semantic chains, networks, databases, and directed or nondirected graphs.

In one example, wherein two triples are organized into a knowledgebase sdata structure that links, denotes a dependency, implies a condition, or otherwise relates the two triples, such a data structure may take a form:

monitor (user, memory usage)→imply (memory usage, installed memory)

in order to express a conditional rule: "If a user monitors memory usage, then memory usage must exist; and the existence of memory usage implies that memory must be installed" or, in a simpler forms, "A user cannot monitor memory usage unless memory is installed." An expert system that conforms to embodiments of the present invention might use or infer logic implied by these related triples, possibly augmented by related rules, by other known facts, by other user interactions, by context, or by other extrinsic information sources, to construct a natural-language answer to a user's natural-language question "Is memory installed in my computer?"

Such an organization of knowledgebase triples may be generated automatically, by means of an embodiment of the present invention, as a function of one or more representations, dependencies, or data structures comprised by one or more business process models, where the one or more models describe an analogous relationship or dependency between business processes, activities, or elements analogous to entities represented by members of the two knowledgebase triples.

Embodiments of the present invention allow expert-system designers to preserve nuances of relationships among elements of business processes and activities and to preserve those nuances during a translation of a business-process model into a component of an expert-system knowledgebase. Because business-process models and expert systems are generally developed by different persons who are skilled in different fields of art, a subtle characteristic of a business process or activity that may be an indirect function of relationships among elements of one or more business processes or activities may be omitted from a design of an expert system that would otherwise address aspects of the one or more business processes or activities.

Relationships among elements of a business's business processes and activities may be manually recorded in a business-process model by the model's designer or implementer. Embodiments of the present invention may use known techniques and technologies, which may include, but are not limited to, methods of data-mining, semantic analytics, and syntactical analytics, to automatically identify further relationships among elements of business processes and activities, to optionally embed those relationships into a business-process model that conforms to embodiments of the present invention, and to ensure that those subtle relationships are accurately translated into a form from which an expert system may infer appropriate rules of interacting with users in natural-language communications related to a characteristic of the business processes and activities.

In one example, consider a business that employs the following procedural activity to process a customer's application to open an account:

1. Collect applicant information
2. Obtain written consent from applicant to verify credit score (dependent upon 1)
3. Verify applicant's credit score (dependent upon 2)
4. Does credit score exceed threshold? (dependent upon 3)
5. Create account (dependent upon 4)
6. Notify applicant of account creation (dependent upon 5)
7. Notify applicant of account denial (dependent upon 4)

The actions and dependency relationships comprised by these steps may be generated automatically, or may manually culled from sources like employee interviews, internal business documentation, process descriptions within business process models, product manuals, flowcharts and other drawings, or industry models and standards. In some cases, a particular action or dependency relationship may be identified or deduced from combinations of automatic and manual sources, including inferred relationships among elements of other steps in the same procedure. For example, it may be deduced from the dependency of step 6 upon step 5 and the dependency of step 5 upon step 4, that the performance of step 6 must depend upon the outcome of step 4.

This representation of the application procedure may be translated into a representation stored in one or more business-process models. In this example, such a representation might be in the form of a functional notation: "<action> (<input><output>)."

Steps 1 and 2, for example, might be identified by means of interviewing employees of the business's Supervisor pool, resulting in a business-process model representation:

collect (supervisor, applicantInfo)
getConsent (supervisor, applicant)

A functional representation of step 3 may be identified by means of interviews with the business's Credit or Sales Department, but an intrinsic, deducible, dependency between steps 3 and 4 may result in steps 3 and 4 being represented by a single functional statement:

verifyCredit (applicant,approval)

Other steps of the activity and functional representations of those steps may be identified in similar ways, relying on sources that may include, but are not limited to, employee interviews, existing knowledgebases, written procedures, deducible conclusions, or other extrinsic documentation.

In a similar manner, other dependencies, preconditions, or other relationships among steps may be documented or inferred and represented in a business-process model. Step 2, for example, might further comprise an implicit function:

notarysign (applicant, consentForm)

and this notarysign function may be a precondition for step 3 if the applicant's credit score may be verified only after the unusual step of a notary public notarizing the applicant's written consent to a credit check. Such an important, but easily omitted, step and its intrinsic dependency relationships may be lost when an expert system for processing credit applications is designed manually. But embodiments of the present invention, by ensuring that such relationships are preserved in a business-process model as components of a translatable data structure, further ensure that every such dependency is translated into a logical dependency in an expert-system's knowledgebase.

In some embodiments, as described below, such relationships may be preserved by organizing a business-process model and a triple store of a knowledgebase into a pair of analogous first and second directed-graph data structures. In such an embodiment, elements of a business process are represented as nodes of a first directed graph in the business-process model and relationships among those elements are represented as dependencies between pairs of nodes of the first directed graph; classes of concepts and activities represented by the business-process model are further represented as nodes of the first directed graph, and relationships among those classes are further represented as dependencies between pairs of nodes of the first directed graph; and analogous members of knowledgebase triples and analogous relationships among those analogous members (where the analogous members and the analogous relationships are respectively analogous to nodes and dependencies of the first directed graph) are represented in a triple store of the knowledgebase as nodes and dependencies of the second directed graph.

Embodiments of the present invention may thus automatically generate behavioral rules, or stored information from which such rules may be inferred, appropriate to a context of a particular business process by automatically translating all or part of a model of that business process into an analogous knowledgebase, where an expert system may use contents of the knowledgebase to infer ways to properly interpret and respond to natural-language user interactions.

The structures and formats illustrated here are not intended to imply constraints upon the types of representations and formats that are within the scope of the present invention. The method of the present invention may be used with expert systems and business-process models that comprise other types, classes, implementations, or representations of business processes, axioms, triples, triple stores, rules, inference engines, and other components of a business-process model and of an expert system.

FIG. 1 shows a structure of a computer system and computer program code that may be used to implement a method for automating natural-language interactions between an expert system and a user in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automating natural-language interactions between an expert system and a user in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for automating natural-language interactions between an expert system and a user.

Any of the components of the present invention could be created, integrated, hosted, maintained, deployed, managed, serviced, supported, etc. by a service provider who offers to facilitate a method for automating natural-language interactions between an expert system and a user. Thus the present invention discloses a process for deploying or integrating computing infrastructure, comprising integrating computer-readable code into the computer system 101, wherein the code in combination with the computer system 101 is capable of performing a method for automating natural-language interactions between an expert system and a user.

While it is understood that program code 107 for automating natural-language interactions between an expert system and a user may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for automating natural-language interactions between an expert system and a user is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
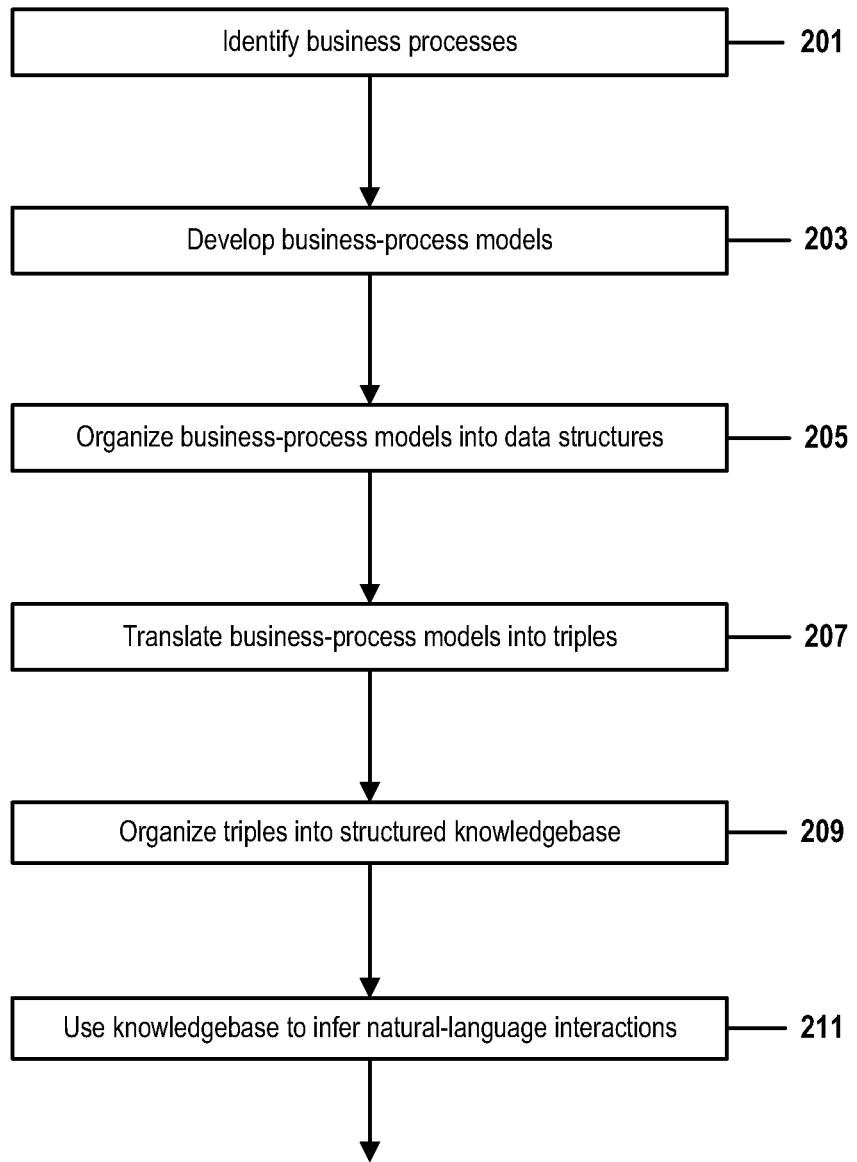
FIG. 2 is a flow chart that summarizes an embodiment of a method for automating natural-language interactions between an expert system and a user in accordance with embodiments of the present invention.

FIG. 2 is a flow chart that summarizes an embodiment of a method for automating natural-language interactions between an expert system and a user in accordance with embodiments of the present invention. FIG. 2 comprises steps 201-211.

The method of FIG. 2 automatically and dynamically translates a set of representations of one or more business processes of one or more businesses into a set of rules, or into representations from which can be inferred a set of rules, where one or more of the rules allow an expert system to infer appropriate ways to interpret and respond to a natural-language communication from a user, and where the communication, interpretation, or response relates to a characteristic of one or more of the business processes. Such rules or representations may be organized, along with other information used to determine behaviors of the expert system, into a data structure stored as all or part of a knowledgebase, where the structure, contents, or internal organization of the knowledgebase may be a function of the structure, contents, or internal organization of the representations of the one or more business processes.

In the embodiment of FIG. 2, the representations of the one or more business processes may comprise one or more business-process models.

Step 201 identifies one or more business processes about which an artificially intelligent expert system will be designed to interact with users. These interactions may comprise actions that may comprise, but are not limited to, interpreting a user's natural-language communication about a characteristic of the one or more business processes, replying to the communication with a natural-language reply, question, or other communication, using the communication to infer additional knowledge to add to the knowledgebase, performing an action or subtask specified by representations of the one or more business processes comprised by the knowledge.

This identification of the one or more business processes may be a function of a combination of manual and automated analytical steps that may comprise, but are not limited to, identifying, classifying, or characterizing an activity, function, standard, operation, procedure, or other characteristic of one or more business processes, activities, or elements of one or more business processes or activities of one or more businesses.

In some embodiments, the one or more business processes may be selected by means known to those skilled in an art related to management science, business management, process automation, information science, and similar fields, or may be selected according to criteria known to those skilled in these arts. For example, a procedure-automation specialist might analyze a business's work flows and identify or select processes to be automated on the basis of those processes' relationships to a critical path of the business's manufacturing workflows.

In some embodiments, a business process may be represented as comprising one or more distinct business activities or functions. In some embodiments a business activity or function may be represented as comprising one or more business processes.

Step 203 represents the one or more business processes as one or more business-process models. A business-process model may take many forms, but in some embodiments of FIG. 2, each activity or function associated with one of the business processes is represented in a form that, as described above, comprises instances of three types of elements: i) an acting or input entity; ii) an action or function that is performed by the acting entity or that is performed upon the input entity; and iii) an output entity that identifies a result of performing the action or function upon the input entity or that identifies an entity upon which the acting entity performs the action or function.

A business-process model may further comprise a set of concept classifications. In some embodiments, an acting entity, input entity, output entity, or other element of a business process or activity may be associated with one or more distinct classes of concepts, where each of these elements may be associated with different classes.

In some embodiments, a business-process model may further comprise a set of activity classes, wherein each activity class is associated with an action or function element of a business process or of a business-process activity, and wherein the business-process model may comprise dependencies or other relationships among one or more activity classes and one or more concept classifications.

In some embodiments, a business activity, process, or function may comprise multiple instances of each of these three types of elements. In some embodiments, a business activity, process or function may be related to other activities, processes, or function through a dependency relationship or other type of relationship. Some or all of these dependency relationships or other types of relationships may be represented, as described below, in the one or more business-process models.

In one example, a business-process model representation (technician, diagnose hardware, computer), comprising a technician acting entity, a diagnose hardware action, and a computer output entity, may associate the technician entity with an Employee concept classification, further associate the diagnose hardware action with a Maintenance Task concept classification, and associate the computer entity with an Electronics Asset concept classification.

In some embodiments, this entire triple may be related to the business-process model triple representation (hardware failure, online report, repair ticket), which identifies an online-reporting business process that generates a repair ticket when a hardware failure is detected. This relationship may take many forms, which may comprise, but are not limited to, a dependency between the two triples wherein the hardware-diagnosis business process represented by the first triple depends upon (that is, cannot be performed until) an occurrence of the online-reporting business process.

In some embodiments, a relationship may exist between elements of the same or different business-processes. It is possible, for example, that an instance of the "diagnose hardware" element of the first triple may exist only if there exists a corresponding instance of the "repair ticket" element.

Dependencies and other types of relationships may also exist between concept classifications. A concept classification "Repair Task," for example, may depend upon a concept classification "Equipment Failure," meaning that an element of a business-process model triple that represents an instance of class Repair Task cannot be created unless there is a corresponding element that represents an instance of class Equipment Failure. Such a rule would represent a logical premise that a business would not allow a repair task to be initiated unless an equipment failure has occurred and would spawn a dependency relationship between a pair of elements of one or more triples, where a first element of the triple is associated with concept classification Repair Task and a second element of the triple is associated with concept classification Equipment Failure.

Dependencies and other types of relationships may also exist between an activity class and other elements of a business-process model. In some embodiments, an action or function element of a triple may be associated with an activity class and in the example above, the function element of the triple (technician, diagnose hardware, computer) might be associated with an activity class "Troubleshoot." In various implementations, this Troubleshoot classification might be related via a dependency or other type of relationship, to other activity classes, such as "Identify Failure," "Report Failure," or "Resolve Failure," or might be related in some way too a concept classification, such as "Capital Equipment" or "Electronic Assets."

In all these cases, a relationship among a combination of concept classifications and activity classes may spawn an analogous relationship among other elements of a business-process model, when the other elements are instances of entities associated with the related classes.

The structure and organization of these relationships and the identification and organization of concept and activity classes are implementation-dependent details of the one or more business models generated in this step. Methods of representing such relationships and entity classes may be known to those skilled in the arts of analytics, data storage, or related fields. In embodiments of the present invention, a goal of a choice of method of this representing is to accurately describe the organization of and relationships among elements of business processes and activities selected in step 201 in such a way that those elements and relationships may be accurately and automatically translated into a form that may be stored in a knowledgebase.

At the completion of step 203, one or more business-process models may have been created that represent all or some of the business processes of one or more businesses, and where a represented business process may be represented by at least one triple comprised of an acting or input entity; an action or function; and an output entity. The one or more business-process models may also comprise representations of relationships among elements of the business processes and representations of relationships among classificationifications of elements of the represented business processes.

In some embodiments, some of the representations comprised by the one or more business-process models will not be in the form of a triple data structure (that is, as an item that comprises an ordered list of three null or non-null data elements). In such embodiments, some or all of the elements of the business processes will be represented or organized in an other form, from which logic or data may be extracted in order to represent, in a knowledgebase of an expert system, a business process or an activity of a business process.

In some embodiments, step 203 may comprise performing a parsing function that may be known to those skilled in the relevant arts. Such a parsing function may generate parsed output that represents elements of one or more business processes or business-process activities.

In some embodiments, parsing a first business process or a first business-process activity may comprise automatically identifying a first input or acting entity, a first action or function, and a first output entity, where these three identified elements are associated with the first business process or activity. In certain cases, the parsing may instead omit identifying one or more of the first input or acting entity, the first action or function, and the first output entity.

In some embodiments, the parsing may further comprise automatically identifying a set of classifications, wherein the first acting or input entity may be associated with a first classification of the set of classifications, the first function or action may be associated with a second classification of the set of classifications, and the first output entity may be associated with a third classification of the set of classifications. In some embodiments, the first and third classifications may be concept classifications and the second classification may be an activity classification.

The parsing may comprise any parsing method or technology known to those skilled in the art of computer science. The choice and implementation of a parsing method may be implementation-dependent or may be a function of a combination of considerations that may comprise, but are not limited to, a content of or an internal organization of a business-process model, a business-process, a business-process activity, a characteristic of an expert-system or of a knowledgebase of an expert system, a format in which a rule is represented or stored by the expert system, a goal of a system designer, or a relationship between a characteristic of a business-process model generated in step 203 and the expert system or the knowledgebase of the expert system.

Step 205 translates each triple generated in step 203, or translates combinations of information-comprising data structures generated or organized in step 203, into a one or more data structures, where the one or more data structures are a function of relationships among elements of the one or more business processes represented in the business-process model.

The data structure created in this step may comprise representations of relationships such as dependencies, hierarchical relationships, or other relationships among the one or more business processes; dependencies, hierarchical relationships, or other relationships among elements of a subset of the one or more business processes; dependencies, hierarchical relationships, or other relationships among classifications that may be associated with elements of the one or more business processes; and other types of dependencies, hierarchical relationships, or other relationships among elements of information comprised by the information generated in the preceding steps of FIG. 2.

In some embodiments, the data structure may comprise a set of relationships, comprising but not limited to, dependencies, tree or graph relationships, or other hierarchical relationships, among one or more classifications. These relationships may be created in this step in order to represent analogous relationships among business processes, component business-process activities, or elements of business processes or component business activities.

Methods of generating such data structures may be known to those skilled in the relevant arts. Other methods may be used, selected as a function of a design goal, a platform characteristic, a business goal, a characteristic of a domain or context, or other implementation-related factors, to create the data structure as a way of representing a logical organization of characteristics of the one or more business processes in a way that facilitates translation of these representations into a knowledgebase of an expert system.

In some embodiments, these one or more data structures comprise a set of directed graphs, wherein elements of business processes and classifications of elements may be represented as nodes of the directed graphs and relationships among elements and classifications may be represented as dependencies between pairs of nodes.

Step 207 automatically translates the organized, structured set of business-process models generated in steps 203 and 205 into a set of rules, where one or more rules may be represented as one or more triple data structures. In some embodiments, the models are translated into an intermediate "precursor" form compatible with the format of a knowledgebase, from which an expert system may infer one or more rules.

There may be a many-to-many relationship between members of the set of rules and members of the set of business-process models, business processes represented by the business-process models, business activities represented by the business-process models, or elements of the business processes or business activities represented by the business-process models. That is, one rule (or rule precursor) may represent a characteristic of a combination of more than one element of a business-process model, business process, or business-process activity, and one business-process model, business process, or business-process activity may be represented by one or more rule or precursor.

A triple generated in this step may comprise, as described above, instances of three types of elements, a subject, a predicate, and an object, which may be analogous to three member elements (an acting or input entity, an action or function, and an output entity) of a triple, generated in previous steps of FIG. 2, that represent all or part of a business process or business-process activity.

Step 209 organizes the triples generated in step 207 into a data structure that is a function of the data structure described in step 205. The data structure generated in step 209 may place the triples generated in step 207 into a final form that is appropriate for incorporation into the knowledgebase of an expert system, if they are not already in such a final form, or may place them into a form that is compatible with a component of a knowledgebase, such as a knowledgebase ontology or a structured set of axioms.

As noted above in the description of step 205, the data structure of step 205 may be a function of relationships among combinations of business processes, business-process activities, elements of one or more business processes or activities, and concept and activity classifications, where these relationships represent aspects of the operation of the one or more business processes identified in step 201.

The data structure generated in step 209 may comprise combinations of data structures that are known to those skilled in the art to be compatible with, or to facilitate, the operation of the expert system, where the contents and internal organization of this data structure allow the expert system to use the data structure and its contents to infer rules for natural-language interaction with users. Such data structures may comprise combinations of hierarchies, trees, tables, linked lists, semantic chains, networks, databases, and directed or nondirected graphs, or other types of data structures that identify relationships among nodes of the data structure, where a node of the data structure generated in step 209 may comprise a triple generated in step 207, an element of a triple generated in step 207, or a classification associated with an element of a triple generated in step 207.

At the conclusion of step 209, a knowledgebase of an expert system will comprise an organized, structured set of triples, wherein the members of the set of triples describe all or part of a set of rules of behavior of the expert system, or represent data and logic from which may be inferred all or part of the set of rules of behavior, and wherein the organization or structure of the set of triples represents relationships, including but not limited to dependency relationships, among the all or parts of the rules of behavior represented by the triples.

Furthermore, each triple and its organization within the knowledgebase data structure may represent three types of elements and relationships among the three types of elements, where those elements and relationships are a function of an automatic translation of a set of corresponding elements and relationships represented in the one or more business-process models generated in step 203. Stated more simply, each knowledgebase triple generated in step 209 represents logic from which may be inferred an expert-system rule that is a function of all or part of a business process identified in step 201.

Similarly, because an internal organization or structure of a data structure generated in step 209 is a function of an internal organization or structure of a data structure generated in step 205, the organization of the knowledgebase representations generated in step 209 is a function of the relationships, as represented by the data structure of step 205, among elements and classifications of business processes and activities identified in step 201.

In step 211, the expert system uses the contents, organization, and structure of the knowledgebase generated in step 209 to infer rules for interacting with users in ways that are related to the one or more business processes. This interacting may comprise, but is not limited to, interpreting a natural-language statement, natural-language query, or other natural-language communication communicated by a user; replying to the natural-language communication; formulating a natural-language response to the natural-language communication; or using the natural-language communication to formulate an other natural-language communication for the purpose of communicating the other communication to the user, to infer additional knowledge in order to complement or supplement the contents of the knowledgebase, or to perform an action or subtask specified by any component of the one or more business processes.

In summation, embodiments of the present invention disclose a method of formatting and structuring representations of elements, and of relationships among elements, of a set of business processes. This method of formatting and structuring allows these representations to be automatically translated into a form that is compatible with a knowledgebase of an expert system, and from which the expert system may infer rules of behavior when interacting with users in relation to a characteristic of one of the represented business processes.

What is claimed is:

1. A method for populating an expert system knowledgebase with an axiom that represents a business process, the method comprising:
a processor of a computer system identifying a correspondence between a business process and an axiom,
where the axiom comprises a rule identifying how the expert system should respond during natural-language interactions with a user,
where the axiom comprises a subject, an object, a predicate, and rule relationships among the subject, the object, and the predicate,
where the business process comprises an input, an output, an action, and process dependencies among the input, the output, and the action,
where the correspondence identifies the subject as corresponding to the input, the object as corresponding to the output, and the predicate as corresponding to the action, and
where the correspondence further identifies a correspondence between each rule relationship and a corresponding process relationship; and
the processor representing the business process by adding to a directed graph that represents axioms stored in the knowledgebase:
three nodes that respectively represent the subject, the object, and the predicate, and
a set of edges that each connect one pair of the subject, the object, and the predicate, and that each represent one of the process dependencies between the connected pair.

2. The method of claim 1, where the axiom is a rule for formulating a natural-language reply to a user question submitted during the natural-language interactions.

3. The method of claim 1, where the axiom is a rule for inferring semantic meaning from the natural-language interactions as a function of the business process.

4. The method of claim 1, where the axiom is a rule for inferring additional rules from the natural-language interactions.

5. The method of claim 1, where the axiom is a rule for selecting, in response to receiving user input during the natural-language interactions, a second axiom stored in the knowledgebase.

6. The method of claim 1, where the knowledgebase is automatically populated as a function of information comprised by the set of business processes.

7. The method of claim 1,
where a classification of a set of classifications is represented as a first classification node of the directed graph,
where the set of classifications comprises a set of concept classifications and a set of activity classifications,
where a first concept classification of the set of concept classifications associates an input domain with the input and with the subject,
where a second concept classification of the set of concept classifications associates an output domain with the output and with the object,
where a first activity classification of the set of activity classifications associates an action domain with the action and with the predicate,
where a first classification relationship identifies a dependency relationship between a pair of classifications of the set of classifications, and where the first classification relationship is a function of a characteristic of the first business process, and
where the representing the business process further comprises adding to the directed graph, as a further function of the characteristic, an edge representing the first classification relationship as a first classification dependency of the process dependencies.

8. The method of claim 1, further comprising providing at least one support service for at least one of creating, integrating, hosting, maintaining, and deploying computer-readable program code in the computer system, where the computer-readable program code in combination with the computer system is configured to implement the identifying and the representing.

9. A computer program product, comprising a computer-readable hardware storage device having a computer-readable program code stored therein, said program code configured to be executed by a processor of a computer system to implement a method for populating an expert system knowledgebase with an axiom that represents a business process, the method comprising:
the processor identifying a correspondence between a business process and an axiom,
where the axiom comprises a rule identifying how the expert system should respond during natural-language interactions with a user,
where the axiom comprises a subject, an object, a predicate, and rule relationships among the subject, the object, and the predicate, where the business process comprises an input, an output, an action, and process dependencies among the input, the output, and the action, where the correspondence identifies the subject as corresponding to the input, the object as corresponding to the output, and the predicate as corresponding to the action, and where the correspondence further identifies a correspondence between each rule relationship and a corresponding process relationship; and the processor representing the business process by adding to a directed graph that represents axioms stored in the knowledgebase:

three nodes that respectively represent the subject, the object, and the predicate, and a set of edges that each connect one pair of the subject, the object, and the predicate, and that each represent one of the process dependencies between the connected pair.

10. The computer program product of claim 9, where the axiom is a rule for formulating a natural-language reply to a user question submitted during the natural-language interactions.

11. The computer program product of claim 9, where the axiom is a rule for inferring semantic meaning from the natural-language interactions as a function of the business process.

12. The computer program product of claim 9, where the axiom is a rule for inferring additional rules from the natural-language interactions.

13. The computer program product of claim 9, where the axiom is a rule for selecting, in response to receiving user input during the natural-language interactions, a second axiom stored in the knowledgebase.

14. The computer program product of claim 9, where a classification of a set of classifications is represented as a first classification node of the directed graph, where the set of classifications comprises a set of concept classifications and a set of activity classifications, where a first concept classification of the set of concept classifications associates an input domain with the input and with the subject, where a second concept classification of the set of concept classifications associates an output domain with the output and with the object, where a first activity classification of the set of activity classifications associates an action domain with the action and with the predicate, where a first classification relationship identifies a dependency relationship between a pair of classifications of the set of classifications, and where the first classification relationship is a function of a characteristic of the first business process, and where the representing the business process further comprises adding to the directed graph, as a further function of the characteristic, an edge representing the first classification relationship as a first classification dependency of the process dependencies.

15. A computer system comprising a processor, a memory coupled to said processor, and a computer-readable hardware storage device coupled to said processor, said storage device containing program code configured to be run by said processor via the memory to implement a method for populating an expert system knowledgebase with an axiom that represents a business process, the method comprising:

the processor identifying a correspondence between a business process and an axiom, where the axiom comprises a rule identifying how the expert system should respond during natural-language interactions with a user, where the axiom comprises a subject, an object, a predicate, and rule relationships among the subject, the object, and the predicate, where the business process comprises an input, an output, an action, and process dependencies among the input, the output, and the action, where the correspondence identifies the subject as corresponding to the input, the object as corresponding to the output, and the predicate as corresponding to the action, and where the correspondence further identifies a correspondence between each rule relationship and a corresponding process relationship; and the processor representing the business process by adding to a directed graph that represents axioms stored in the knowledgebase:

three nodes that respectively represent the subject, the object, and the predicate, and a set of edges that each connect one pair of the subject, the object, and the predicate, and that each represent one of the process dependencies between the connected pair.

16. The computer system of claim 15, where the axiom is a rule for formulating a natural-language reply to a user question submitted during the natural-language interactions.

17. The computer system of claim 15, where the axiom is a rule for inferring semantic meaning from the natural-language interactions as a function of the business process.

18. The computer system of claim 15, where the axiom is a rule for inferring additional rules from the natural-language interactions.

19. The computer system of claim 15, where the axiom is a rule for selecting, in response to receiving user input during the natural-language interactions, a second axiom stored in the knowledgebase.

20. The computer system of claim 15, where a classification of a set of classifications is represented as a first classification node of the directed graph, where the set of classifications comprises a set of concept classifications and a set of activity classifications, where a first concept classification of the set of concept classifications associates an input domain with the input and with the subject, where a second concept classification of the set of concept classifications associates an output domain with the output and with the object, where a first activity classification of the set of activity classifications associates an action domain with the action and with the predicate, where a first classification relationship identifies a dependency relationship between a pair of classifications of the set of classifications, and where the first classification relationship is a function of a characteristic of the first business process, and where the representing the business process further comprises adding to the directed graph, as a further function of the characteristic, an edge representing the first classification relationship as a first classification dependency of the process dependencies.

\* \* \* \* \*